Oct. 26, 1965 G. R. HARTING 3,213,989
HYDRAULIC FRICTION DEVICE
Filed Dec. 31, 1962 2 Sheets-Sheet 1
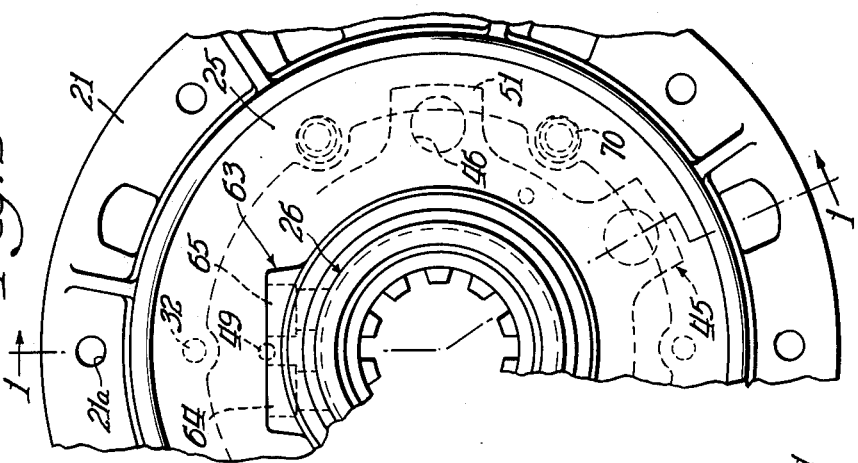
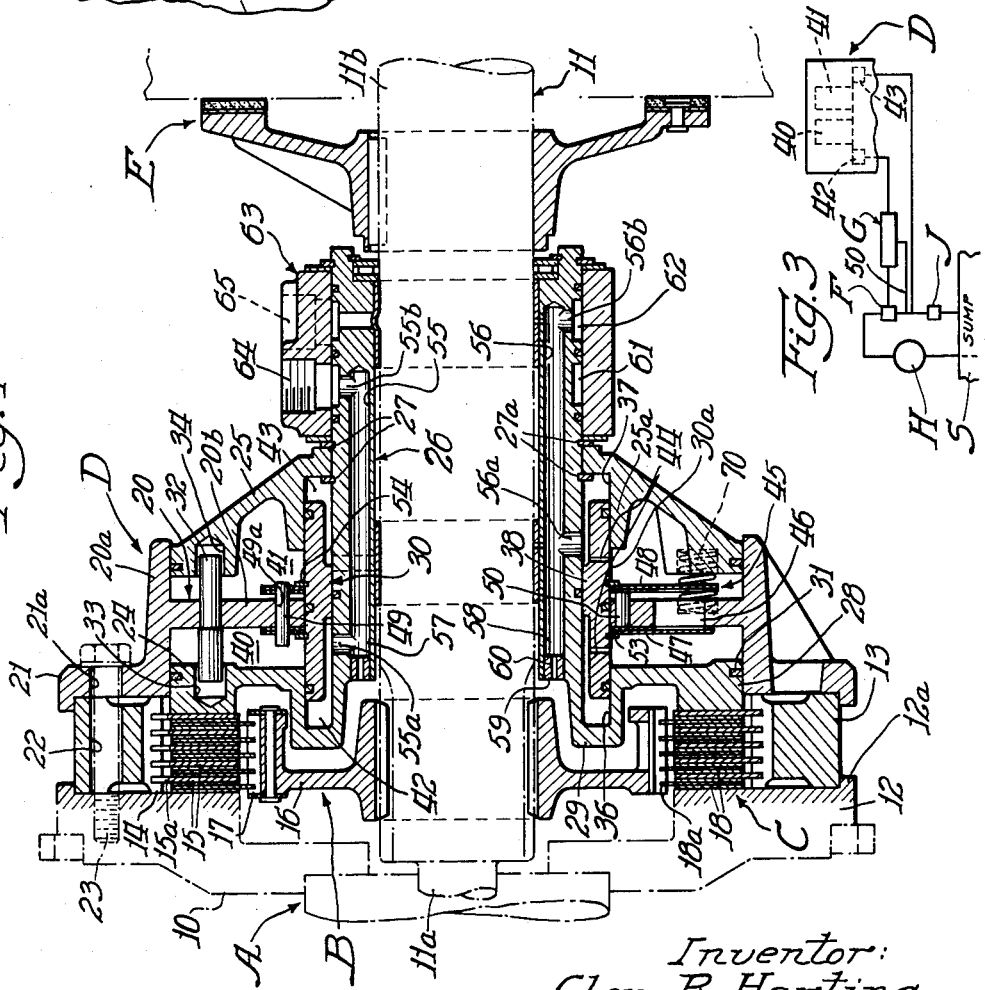
Inventor:
Glen R. Harting
By: Joseph W. Malleck Atty.

Oct. 26, 1965   G. R. HARTING   3,213,989
HYDRAULIC FRICTION DEVICE
Filed Dec. 31, 1962   2 Sheets-Sheet 2
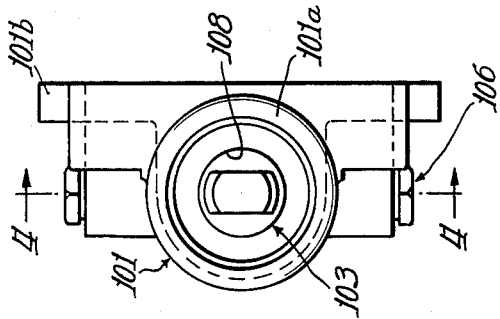
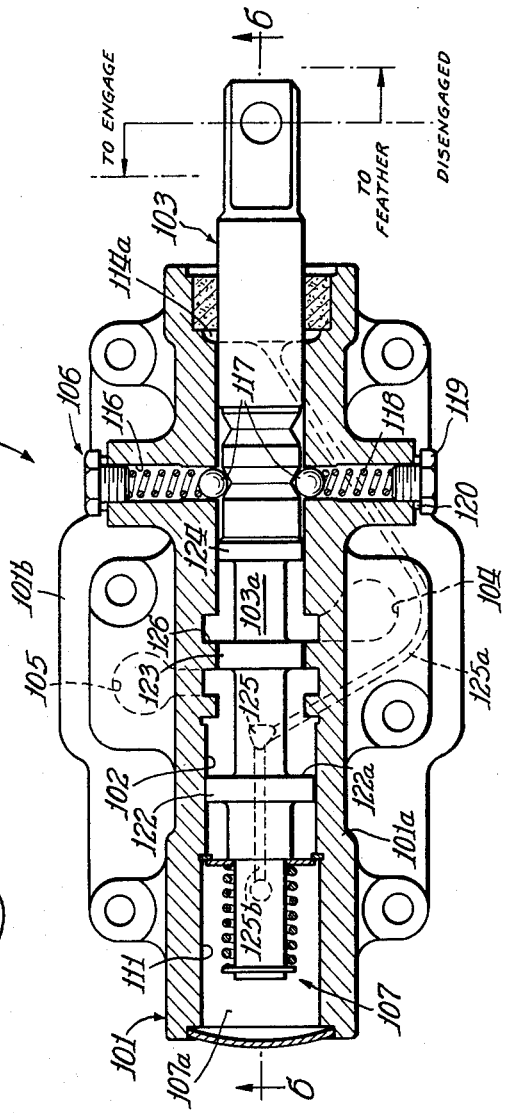
Inventor:
Glen R. Harting
By: Joseph W. Malleck Atty.

United States Patent Office 3,213,989
Patented Oct. 26, 1965

3,213,989
HYDRAULIC FRICTION DEVICE
Glen R. Harting, Rockford, Ill., assignor to Borg-Warner Corporation, Chicago, Ill., a corporation of Illinois
Filed Dec. 31, 1962, Ser. No. 248,677
11 Claims. (Cl. 192—86)

This invention relates to hydraulically operated friction devices and more particularly to a single acting type hydraulic clutch adapted as a master clutch for tractors or other earth moving machinery, but not limited to such uses.

This application is directed to improvements over the hydraulic clutch mechanisms disclosed and claimed in U.S. Patent Nos. 2,868,341; 2,920,732; and 3,032,157, each of which is assigned to the assignee of this invention.

The above-mentioned patents introduced to the hydraulic clutch art for the first time, a unique hydraulic operating mechanism which contained a plurality of chambers with novel fluid transfer means therebetween to provide unprecedented rapid clutch engagement and disengagement. The fluid chambers thereof not only maintained hydraulic balance throughout all phases of clutch operation but enabled reservoirs of fluid to be employed for quick clutch actuation in response to the introduction of a small amount of high pressure fluid in one of the chambers.

This invention is particularly related to the problems encountered in employing the fluid transfer concept within the embodiment of a single-acting hydraulic friction device requiring different characteristics of operation and while at the same time providing improvements which serve the purposes of both a single and double acting hydraulic friction device.

Therefore, a principal object of this invention is to provide an improved hydraulically actuated friction device.

Another object of this invention is to provide a single-acting type hydraulic friction device (single acting herein being defined to relate to a clutch mechanism for transmission of drive therethrough along one power path), having a rotatable hydraulic actuating assembly which is adapted for limited axial movement between two extreme positions, one extreme position corresponding to the fully engaged condition of the friction device and the other extreme axial position corresponding to the disengaged or neutral condition of the friction device (said neutral condition may alternatively be employed for the positive engagement of a cooperating brake mechanism). A particular feature of this object is the provision of a hydraulic actuating assembly cooperating with a hydraulic control system which continuously feeds a low pressure fluid to only certain chambers defined within the actuating assembly, while a high pressure fluid may be selectively introduced to the other of the chambers of the actuating assembly. The prior art as represented within the above-mentioned patents disclose mechanisms in which a neutral condition was necessary which did not correspond to an extreme axial position of the actuating assembly and therefore required feed of low pressure hydraulic fluid to all chambers of the actuating assembly during a neutral condition.

Another object of this invention is the provision of a hydraulically actuated friction device which employs an actuating assembly comprising a spool-like member which is adapted to fit about the output shaft of the friction device and adapted for limited axial movement thereon; the spool member has radially extending end walls serving as piston portions, the outer peripheries of the piston portions being adapted to slidably receive an outer cylindrical member drivingly connected to a flywheel or input member of the friction device and which cylindrical member carries a barrier plate or reaction means extending radially inwardly into the space between the piston portions and defining major chambers therein. Further chamber defining means is employed within such spool member to cooperate with the barrier plate in defining at least one minor chamber and also serving to actuate a fluid transfer means disposed to provide selective communication between major chambers thereof in response to a predetermined introduction of high pressure fluid. A specific structural feature of this object is the provision of conduit means disposed within the central portion of the spool member adapted to communicate high and low pressure sources with respective chambers of the actuating assembly and thereby remove the necessity for disposing such conduit means within the output shaft of the friction device.

Another object of this invention is to provide a single-acting type hydraulic friction device employing fluid transfer means which may be easily attached to conventional flywheels of agricultural vehicles or earth moving machinery such as tractors.

Still another object of this invention is to provide a single-acting type hydraulic friction device employing fluid transfer means between major chambers thereof, the device having an outer cylindrical member cooperating with a spool-like member having piston portions thereon to comprise an actuating assembly, each said member constituting a part of the housing for the actuating assembly. A specific structural feature of this object is the arrangement of said spool member and cylindrical member on the output shaft of the device so that the assembly may be easily disassembled for quicker access and easier maintenance of the interior of the device.

Yet another object of this invention is the provision of an improved hydraulically actuated friction device employing tied piston portions adapted for limited axial movement to provide engagement and disengagement of the friction means and which has fluid transfer means for transferring fluid between major chambers thereof during the engaging phase of the device, the device being particularly characterized by the inclusion of a unitary accelerator means responsive to the introduction of high pressure fluid to control said fluid transfer means.

Yet still another object of this invention is the provision of a unique combination consisting of a novel feathering type valve in the above recited single acting type hydraulic friction device, which together constitute a revolutionary type hydraulic mechanism which can precisely simulate the actuation of a mechanical friction device in that it can infinitely vary the amount of slip between the friction engaging surfaces. This combination contemplates the use of the quick fluid transfer characteristics of the above-mentioned objects to enable a feathering valve to put in or relieve the amount of hydraulic fluid pressure, used for clamping the friction surfaces together, in accordance with the degree of axial movement of operation of the valve. There is in essence a wedding of the rapid fluid transfer means and a manually-operated control valve which is uniquely adapted to give a proportional "feel" to the operator in accordance with the degree of clutch engagement. A particular feature of this object is the provision of structure for said combination characterized by simplicity of design, ease of manufacture, and rapidity of operation.

Other structural features of the valve forming a part of the above objects include a valve housing having an axially spaced inlet and outlet means, a slidable valve member carrying a plurality of lands thereon adapted so that movement of the valve member to one side of a neutral position may permit full fluid flow between the inlet and outlet means and movement of the valve member in an opposite direction of neutral position controls the amount of fluid flowing therebetween in degrees with an accompanying tendency of the valve to return to neutral with a force proportional to the degree the valve is moved away from the neutral position. The returning force is provided by a reaction surface which is acted upon by fluid with a varying force depending upon the degree to which a drain port is cut off during the movement of the valve in said opposite direction.

Other objects and features of the invention will be readily apparent to those skilled in the art from the specification and appended drawings illustrating a certain preferred embodiment in which:

FIGURE 1 is a central sectional view of a hydraulically actuated friction device embodying the principles of this invention and taken substantially along line 1—1 of FIGURE 2;

FIGURE 2 is a fragmentary elevational view of the embodiment of FIGURE 1, looking toward the left thereof;

FIGURE 3 is a schematic illustration of a hydraulic operating system for the device of FIGURE 1;

FIGURE 4 is a central sectional view of a valve device used in the hydraulic system of FIGURE 3 and taken substantially along line 4—4 of FIGURE 5.

FIGURE 5 is an end elevational view of the valve device of FIGURE 4; and

FIGURE 6 is a fragmentary central sectional view of the valve device of FIGURE 4 and illustrating the valve device in another operative position.

Referring now to the drawings, and more particularly to FIGURES 1–3, there is illustrated a preferred embodiment of the present invention comprising a single-acting type hydraulic clutch designed for use as a master clutch for tractors and other earth moving machinery. In the broad aspects, the embodiment comprises input means A including a flywheel 10, output means B including an output shaft 11, gradually engageable friction means including a multiple disc clutch pack C for providing selective conjoint rotation of the input and output means, and hydraulically actuatable mechanism D mounted upon the output shaft and adapted for reciprocation thereon to engage the clutch pack in one extreme axial position and engage a brake means E when disposed in an extreme opposite axial position. The hydraulic system for actuating the mechanism D broadly comprises, as shown in FIGURE 3, sources for a low and a high pressure supply to the mechanism D, the high pressure being selectively admitted in accordance with the control of a novel feathering valve G, forming part of the invention herein. the pressure supplies may be provided by a primary pump H having the fluid output thereof regulated by relief valve F which provides a high pressure supply that is controlled by the feathering valve G; the relief pressure from the valve F is adapted to be returned to a sump S and also employed as the low pressure source to the mechanism D. An auxiliary relief valve J or the natural constriction of the conduits leading back to sump may be utilized to provide and maintain the low pressure.

Turning now more particularly to the construction, the flywheel 10 may be connected to a suitable prime mover (not shown) and is adapted to rotatably journal one end 11a of the driven shaft 11 which forms a part of the output means B. The flywheel 10 is of the flat face type and has an outer radial portion 12 provided with an annular lip 12a adapted to receive therein a drive ring 13 abutting the flywheel 10. The drive ring 13 has a plurality of longitudinally extending grooves 14 on its interior surface which are adapted to receive tangs 15a formed on the outer periphery of each of a plurality of clutch discs 15.

The output means B more particularly comprises an annular hub 16 having a plurality of circumferentially spaced axially extending grooves 17 which receive tangs 18a formed on the outer periphery of each of a plurality of clutch discs 18 which are interleaved with the discs 15.

The discs 15 and 18 of each of the output and input means are adapted for limited axial movement within the respective grooves and are adapted for frictional and interengagement when clamped between the flywheel 10 and the actuating mechanism D as described hereinafter.

The right end portion 11b of the shaft 11 is adapted to drivingly mount the brake E which may be used for a variety of purposes, here preferably used for a transmission brake means. Axial movement of the actuating mechanism D not only is adapted to afford engagement or disengagement of the clutch pack C, but also may actuate the brake E.

The hydraulic actuating mechanism D particularly comprises an annular reaction means 20 having a cylindrical portion 20a provided with a radially outwardly extending flange 21 which has a plurality of circumferentially spaced openings 21a in register with openings 22 in said drive ring; the openings are adapted to receive fastening means or bolts 23 which are threadably secured to the flywheel for holding the reaction means 20 and drive ring 13 together. The reaction means has integrally formed thereto a barrier plate 20b extending radially inwardly from the cylindrical portion 20a thereof and is disposed intermediate the ends of portion 20a.

Disposed on either side of the plate 20b are piston portions 24 and 25, piston portion 24 is integrally formed to a sleeve portion 26 which extends about the output shaft 11 and is adapted to support the piston section 25. Piston portions 24 and 25 are locked together for coordinate movement by snap rings 27 received in grooves 27a provided in the outer periphery of the sleeve 26. The piston portions and sleeve together define a spool member.

Piston portion 24 has an outwardly facing boss 28 adapted to apply mechanical pressure to the clutch pack C for establishing clutch engagement. The innermost extent of the piston portion 24 has an outwardly extending channel 29 adapted to provide a shallow annular chamber configuration therein for cooperating with an accelerating piston 30 as hereinafter described. Each of the piston portions 24 and 25 are adapted for sliding sealing engagement with the cylindrical portion 20a and have suitable sealing means 31 for sealing engagement therewith. The piston portions are drivingly connected to the reaction means 20 by pins 32 which extend through the reaction means 20 and into bores 33 and 34 formed respectively in each of the piston portions.

Within the interior provided by the piston portions and cylindrical portions 20a is defined a plurality of fluid chambers. Accelerating piston 30 extends between and engages surfaces 36 and 37 formed respectively on the interior of the channel 29 and on a flange 25a extending inwardly of piston portion 25; the accelerating piston 30 has a radially inwardly extending flange 38 adapted to slidingly engage the outer periphery of the sleeve portion 26. The surfaces 36 and 37 on the piston portions, it should be noted, are in general alignment with the inner periphery of plate 20b so that the cylindrical outer surface 30a of the accelerating piston may engage thereacross. The chambers defined thereby include a pair of outer major chambers 40 and 41, each being on opposite sides of the plate 20b; a pair of inner minor chambers 42 and 43, each being on opposite sides of the radially inwardly extending flange 38 of the accelerating piston 30. Chambers 40 and 42 are in fluid communication by restricted orifice means 44.

Fluid transfer means 45 is provided for permitting fluid interchange between the major chambers during axial movement of the piston portion, and to prevent such fluid interchange at other times. The transfer means 45 comprises a plurality of openings 46, here preferably being six in number, which extend through the plate 20b and communicate the outer major chambers 40 and 41 when not closed. Interconnected valve discs 47 and 48 are stationed on opposite sides of the plate 20b and are interconnected by pins 49 slidable in openings 49a provided in the portion 20b with spacer pins 50 maintaining a minimum distance therebetween. The valve discs are of the type comprised of a thin flexible sheet metal material bonded to a thicker flexible sheet metal material and have provided on their outer peripheries a plurality of tangs 51 which are adapted to be aligned with the openings 46. The valve discs operate by being shifted into one or other of its extreme axial positions whereby one disc controls fluid flow in one direction when flush against the reaction means, or the other disc controls fluid flow in an opposite direction therethrough when flush against the opposite side of the reaction means. The valve discs are brought into either of the operative positions by movement of the accelerating piston 30 which is connected by lost motion means comprised of a pair of axially spaced snap rings 53 and 54, mounted in the outer periphery of the accelerating piston, adapted to contact valve discs 47 and 48.

The sleeve portion 26 is provided with a pair of longitudinally extending bores 55 and 56 in the cylindrical wall of sleeve portion and open terminations at ends 57 and 58 adjacent the clutch pack. Plugs 59 are inserted in said open ends and each plug contains a central restricted port 60 therethrough which is adapted to permit fluid in bores 55 and 56 flow therethrough and provide oil in the clutch packs for cooling purposes. Bore 55 has a radially outwardly extending conduit 55a in communication therewith and with chamber 42 and the other bore 56 has a radially outwardly extending conduit 56a in communication with the chamber 43. The bores have at their other ends respectively, a radially outwardly extending conduit 55b and 56b. Conduit 55b communicates with an annular recess 61 provided in the outer periphery of the sleeve portion 26 and conduit 56b communicates with an annular recess 62. A collector ring 63 is mounted about the end 26c of the sleeve portion and is provided with bores 64 and 65 extending radially therethrough which are in respective communication with the annular recesses 61 and 62 formed in the sleeve portion. Bore 64 is adapted to be placed in communication with a high pressure fluid supply as controlled by relief valve F and as admitted by feathering valve G. The other bore 65 in the collector ring is adapted to be placed in communication with a low pressure fluid supply drawn continuously from the return pressure line back to sump. Alternatively, independent fluid supply sources may be utilized.

Operation of the single-acting clutch will be disclosed in connection with the feathering valve combination embodiment, next to be described.

*Combination mechanism of single acting hydraulic clutch and feathering valve*

As forming part of a second combination, the feathering valve G as disclosed in FIGURES 4–6 will now be described. Shown schematically in FIGURE 3, the feathering valve may be utilized to control the admission of high pressure fluid to the single-acting hydraulic clutch for providing the type of clutch engagement desired. The feathering valve G broadly comprises a valve body or housing 101 having a stepped bore 102 therein; within the bore 102 is disposed a valve spool of member 103 adapted to control fluid flow between an inlet means 104 and an outlet means 105 provided in the valve body. Detent means 106 is provided between the valve body and valve member for automatically stationing the valve member in neutral or full clutch engaging position. Return spring means 107 is provided at one end of the valve member tending to urge the valve member into its neutral position.

Describing in more particularity the valve body 101, it may be seen to comprise a longitudinally extending cylindrical central portion 101a with mounting sections 101b integrally formed to one side thereof adapted for mounting the valve body to a suitable support. The stepped bore 102 has a first portion 108 which is of a reduced diameter and has a pair of axially spaced annular grooves 109 and 110. The larger portion of the bore 102 is designated 111. The larger portion 111 of the bore 102 is closed at one end by a cap 112 which is resiliently sprung into an annular recess 113 in the valve body. The opposite end of the bore 102 and at the end of the smaller portion 108, is provided a seal 114 adapted to sealingly engage the valve member or spool 103; the seal 114 is journaled within a recess 115 provided in the valve body.

A bore 116 extends through the valve body in a transverse or radial direction and is adapted to house the detent means 106. More particularly, the detent means 106 comprises a plurality of steel balls 117 which are urged into contact with the valve member 103 by a compression spring 118. One end of the spring 118 engages the balls and its other end is adapted to engage a cap screw 119 threadably received in the end of the bore 116. A gasket 120 is mounted about each of the cap screws 119 for sealing purposes.

A drain port 125 is provided in the body and terminating inwardly at the portion 111 of the stepped bore. The drain port is in communication by way of conduit 125a with the seal chamber 114a and by way of conduit 125b with the return spring chamber 107a so that fluid pressure in these chambers may drain to a sump by way of means 150 (see FIG. 3).

Turning more specifically now to the valve spool or member 103, it may be seen to comprise a central cylindrical portion 103a and has provided thereon a plurality of annular lands 122, 123 and 124. Lands 123 and 124 are of generally commensurate diametrical dimension and are adapted to slide in engaging relationship with the smaller portion 108 of the stepped bore 102. Land 122 is of a larger diametrical dimension than the other lands and is adapted to slide in engaging relationship with the larger portion 111 of the stepped bore 102. Lands 123 and 124 are spaced apart axially a distance sufficient so that the valve member may be moved into a position whereby the inlet means 104 and the outlet means 105 are in full communication between lands 124 and 123. The land 122 is spaced axially from the adjacent land 123 a distance sufficient so that the lip or edge 122a thereof may begin to gradually cover the drain port 125 after the land 123 has moved to the right of lip 126 forming an edge of groove 110 in the valve body. The spacing of the land 122 is critical and must be predetermined so that the desired amount of fluid pressure reaction against the side 122b of the land 122 will give the proper amount of "feel" or tendency to return the valve spool back to the indicated neutral position (see FIGURE 4) in accordance with the distance that the valve member is moved to the right of neutral position.

Grooves 130 and 131 are provided in the outer periphery of the valve member 103 and are located so that the groove 131 will receive the steel balls 117 (part of the detent means 106) for stationing the valve member in a neutral position of the clutch device and groove 130 will receive the steel balls 117 for stationing the valve member in neutral position. Groove 130 is located so that the valve member will be stationed in a position so that full communication may be had between the inlet and outlet means 104 and 105.

The righthand end 103c of the valve member 103 is provided with an aperture 132 adapted to receive manual operating means (not shown, but preferably a handle) and the lefthand end 103d of the valve member is provided with a stop ring 133. A return spring 134 is mounted between the stop ring 133 and annular ring 135 adapted to engage snap ring 136 received in a groove 136a in the valve body. The spring 134 is adapted to turn the valve member back to neutral position.

Turning now in detail to the operation of the single-acting hydraulic clutch and feathering valve, the initial engaging, locking engaging, and disengaging operational phases shall be hereinafter discussed. When the clutch pack C is in the disengaged condition, the output means consisting of the driven discs 18, hub 16, and driven shaft 11, are not transmitting power. Accordingly, rotation is confined to the flywheel 10, drive ring 13, discs 15, and the actuating mechanism D; the oil supply ring 63 is fixedly connected to the fluid pressure supply and does not rotate therewith. In such conditions, low pressure fluid, in the range of 25 p.s.i. is continuously supplied to the chambers 43 and 41 disposed on the righthand side of the reaction means 20b. The fluid pressure in communication with the chambers 42 and 40, disposed on the lefthand side of the reaction plate 20b, may be approximately equal to atmospheric pressure. The piston portions 24 and 25 are generally centered about the reaction plate by operation of springs 70 which act between the plate 20b and the piston portion 25.

To provide initial engaging of the clutch pack C and assuming that full clutch engagement is desired as opposed to a feathering operation, the valve member 103 is moved manually to the left until the detent means is engaged in the groove 131 as illustrated in FIGURE 4. In such position, high pressure fluid is permitted to flow freely through the feathering valve, through bore 55, conduit 55a, and into minor chamber 42. The unitary accelerating piston 30 is thereby urged to the right by pressure and carries the fluid transfer means 45 therealong until the disc 47 is flush against the lefthand side of the reaction means 20b. Fluid in the outer chambers 40 and 41 may then flow only in one direction, to the left, as forced by the major piston portion 25. After the transfer means is positioned, the major piston portion 24 is brought into touching engagement with the clutch pack C. Locking engagement is provided by further transmission of fluid through the restricted orifice means 44 communicating the minor chamber 42 and the major chamber 40.

To provide disengagement of the single acting clutch, the valve member 103 is moved manually to its neutral position thereby cutting off high pressure fluid supply and reducing the pressure in chamber 42 to atmospheric. Meanwhile, low pressure fluid is being supplied to chamber 43 and thereby provides a pressure differential which tends to return the accelerating piston 30 to the far left position and permit a quick retransfer of fluid between the outer major chambers 40 and 41—promoting a quick disengagement. Low pressure fluid is always communicated between the inner chamber 42 and outer chamber 40 by means of the restricted orifice means 44.

In order to provide a simulated feathering of the hydraulic clutch as possible with a mechanical clutch, the valve member 103 may be moved to the right of neutral position of the valve; the movement should be sufficient to admit high pressure fluid between the lands 123 and 122 and thereby into the single acting clutch chamber 42 as before described. The difference now is that the amount of fluid being admitted places a feedback force on the valve member so that the operator can accurately control the amount of fluid admitted by adjusting the axial position of the valve member. The amount of fluid being transmitted is interpreted into a return force provided by a pressure reaction acting against the land 122 since it is larger than the land 123. The amount of such reaction is inversely proportional to the amount of fluid which can escape through the drain port 125. The further the valve member is moved to the right, permitting more fluid to flow between the inlet and outlet, the more the drain port is cut off by lip 122a and thereby permitting more fluid pressure to act against the land 122.

While certain preferred embodiments of the invention have been specifically disclosed, it is understood that the invention is not limited thereto, as many variations will be readily apparent to those skilled in the art and the invention is to be given its broadest possible interpretation within the arms of the following claims.

I claim:

1. A hydraulically actuated friction device, comprising: rotatable input and output means, gradually engageable friction means adapted to provide for selective conjoint rotation of said input and output means, a hydraulic actuating assembly for said friction means being particularly characterized by the inclusion of a spool member having opposed piston portions with one piston portion adapted for providing engagement of said friction means, said spool member being disposed about said output means and adapted for axial movement thereon, hydraulic reaction means disposed between said piston portions and being drivingly connected with said input means, accelerating piston means cooperating with said spool member and reaction means to define first and second major chambers on opposite sides of said reaction means and at least one minor chamber communicating with said first chamber fluid transfer means adapted to provide for fluid interchange between said major chambers during the initial engaging phase of operation of said spool member and adapted to prevent further fluid flow between said major chambers at other times, means providing a source of low pressure fluid and a source of high pressure fluid, means adapted for selective application of said high pressure fluid to said minor chamber and means adapted for continuous application of said low pressure fluid to said second major chamber, and conduit means carried within the radially innermost portion of said spool member and communicating said fluid sources with said respective chambers of said actuating assembly.

2. A hydraulically actuated friction device as in claim 1, in which said fluid transfer means particularly comprises at least one opening in said reaction means communicating major chambers thereof, and fluid transfer plates disposed on opposite sides of said reaction means each having a flexible tang portion aligned with said opening, means extending between said plates and reaction means for imparting rotative drive thereto, and spacing means adapted so that when one tang portion is disposed flush against one side of the reaction means, the other tang portion will be forced off the surface of the opposite side of said reaction means, said spacing means adapted to maintain a space therebetween which is slightly in excess of the thickness of said reaction means by a micro value.

3. A hydraulically actuated friction device as in claim 1, in which said hydraulic reaction means comprises a cylindrical housing portion in slidable sealing engagement with the piston portions of said spool member, and said spool member having cylindrical surfaces disposed radially inwardly of said cylindrical housing portion, and said accelerating piston means comprising a unitary member responsive to the fluid pressure in said minor chamber and having portions thereof in sliding sealing engagement with the cylindrical surfaces of said spool member.

4. A hydraulically actuated friction device as in claim 1, in which said piston portions of said spool member carry at least one drive pin extending therebetween and through said reaction means to impart rotative drive thereto.

5. A hydraulically actuated friction device, comprising: a driving flywheel; a clutch pack having certain clutch discs drivingly connected with the flywheel and other clutch discs drivingly connected with an output shaft; a hydraulic actuating mechanism drivingly connected with said flywheel and comprising a spool member slidable on said output shaft and having a pair of spaced piston portions, said spool member having a plurality of fluid conduits therein and extending substantially in a direction parallel to the axis of said output shaft, a reaction member drivingly connected with said flywheel and extending between said piston portions of said spool member and having a cylindrical portion in sliding sealing engagement with the peripheries of said piston portions; a unitary accelerating piston disposed between said piston portions and cooperating with said spool member and reaction means to define a pair of major chambers and a pair of minor chambers, restricted orifice means communicating one of said major chambers with one of said minor chambers; fluid transfer means adapted to communicate opposite sides of said reaction means for permitting fluid flow between said major chambers during reciprocation of said actuating mechanism, said cylindrical portion of said reaction means and said piston portions of said spool member cooperating to define a housing for said actuating mechanism.

6. In a single acting hydraulic clutch mechanism having an input and output means, an operating assembly, comprising: clutch actuating piston means adapted to provide clutch engagement of said mechanism and having two opposed fluid actuated sections; reaction means disposed between said sections; unitary accelerator means interconnecting said sections and slidably disposed on said piston means, said accelerator means, reaction means, and clutch actuating piston means cooperating to define a first, second, third, and fourth fluid chamber, said first and second chambers being on a side of said reaction means opposite from that of said third and fourth chambers, means adapted to normally provide a first fluid supply to said third and fourth chambers disposed on one side of said reaction means, fluid transfer means communicating said second and third fluid chambers and adapted to permit fluid flow in only one direction therebetween in accordance with actuation by said accelerator means, means providing a restricted fluid communication between said first and second fluid chambers and between said third and fourth fluid chambers, and means adapted to selectively provide a second fluid pressure supply to said first fluid chamber which is greater than said first pressure supply whereby movement of said clutch actuating piston means may be effected for clutch engagement.

7. A clutch operator assembly as in claim 6, in which said clutch actuating piston means comprises a circular sleeve provided with generally longitudinally extending fluid conduits in the walls thereof, and said fluid actuated sections extending radially outwardly from said sleeve at spaced longitudinal locations thereof.

8. A clutch operator assembly as in claim 7, in which one of said fluid actuated sections is integral with said sleeve and the other of said actuated sections being mounted on said sleeve and held against axial movement thereon, and said reaction means carrying drive pins adapted to align said fluid actuated sections for reciprocation and to transmit drive thereto.

9. Clutch operator assembly, as in claim 6, in which said accelerator means comprises an annular sleeve member having a radially inwardly extending flange adapted to engage said piston means, and said piston means having axially extending portions carrying surfaces adapted to interengage the exterior of said accelerator means.

10. A clutch operator assembly as in claim 6, in which said reaction means comprises an annular, flat plate having a sleeve integrally formed at its outer periphery and extending laterally thereof, said sleeve having a raidally outwardly extending annular flange adapted for driving connection to the input means of said single acting clutch mechanism.

11. A hydraulically actuated friction device, the combination comprising: a transmission mechanism having an output shaft and a selectively engageable and disengageable friction means; an actuating mechanism mounted about said output shaft for reciprocal movement and having connected piston portions adapted for movement between two axial positions thereof, said actuating mechanism having a plurality of chambers for receiving fluid to actuate said piston portion, a hydraulic control system having a first pressure source always in communication with certain of said chambers and a second pressure source selectively in communication with the other of said chambers, said actuating mechanism having fluid conduit means therein communicating directly with said fluid sources independently of said output shaft; and a brake means disposed on said output shaft adapted for actuation and response to reciprocal movement of said actuating mechanism and in a manner opposed to the actuation of said friction means.

References Cited by the Examiner

UNITED STATES PATENTS

| | | | |
|---|---|---|---|
| 2,861,480 | 11/58 | Curtis | 192—86 X |
| 2,919,778 | 1/60 | Aschauer | 192—86 |
| 2,969,131 | 1/61 | Black et al. | 192—86 X |
| 3,000,478 | 9/61 | Carter | 192—18.1 |
| 3,032,157 | 5/62 | Richards | 192—87 |

DAVID J. WILLIAMOWSKY, *Primary Examiner.*